United States Patent [19]
Sukejima et al.

[11] Patent Number: 5,852,067
[45] Date of Patent: Dec. 22, 1998

[54] NEAR INFRARED RAYS-CURING PUTTY COMPOSITION

[75] Inventors: Hajime Sukejima; Shinji Tomita, both of Hiratsuka; Shuichi Sugita; Kazuhiko Ooga, both of Chiba, all of Japan

[73] Assignees: Showa Denko K. K., Tokyo; Kansai Paint Co., Ltd., Hyogo-Ken, both of Japan

[21] Appl. No.: 749,975

[22] Filed: Nov. 15, 1996

[30] Foreign Application Priority Data

Nov. 17, 1995 [JP] Japan .................................... 7-322480

[51] Int. Cl.$^6$ .............................. C08L 1/12; C08L 63/12; C08L 67/06; C08L 67/07
[52] U.S. Cl. ................................. 522/53; 522/63; 522/65; 522/57; 522/79; 522/81; 522/102; 522/103; 522/106; 522/107; 522/120; 522/121; 522/141; 522/142; 522/85; 524/41; 524/513; 524/517
[58] Field of Search ................................... 522/24, 26, 27, 522/28, 65, 79, 81, 102, 103, 106, 107, 121, 142, 85, 120, 141, 53, 57, 63; 524/41, 513, 517

[56] References Cited

U.S. PATENT DOCUMENTS

| | | | |
|---|---|---|---|
| 4,147,688 | 4/1979 | Makhlouf et al. | 260/33.6 EP |
| 4,180,489 | 12/1979 | Andrew et al. | 428/402 |
| 4,220,679 | 9/1980 | Backhouse | 427/401 |
| 4,290,932 | 9/1981 | Wright et al. | 260/29.6 WB |
| 4,461,870 | 7/1984 | Kanda et al. | 525/123 |
| 5,348,998 | 9/1994 | Ito et al. | 524/190 |

FOREIGN PATENT DOCUMENTS

| | | | |
|---|---|---|---|
| 0 438 123 | 7/1991 | European Pat. Off. | C08F 2/46 |
| 54-117588 | 9/1979 | Japan | C08F 2/50 |
| 3-111402 | 5/1991 | Japan | C08F 2/50 |
| 6-192459 | 7/1994 | Japan | C08J 9/14 |

*Primary Examiner*—Susan W. Berman
*Attorney, Agent, or Firm*—Cushman, Darby & Cushman, IP Group of Pillsbury, Madison & Sutro

[57] ABSTRACT

A near infrared rays-curing putty composition containing (A) a polymerizable ethylenically unsaturated group-containing resin, (B) a polymerizable ethylenically unsaturated compound and (C) a near infrared rays polymerization initiator, said near infrared rays polymerization initiator (C) being a near infrared rays-absorbing cationic dye and a resin powder consisting of gelation polymer fine particles.

7 Claims, No Drawings

NEAR INFRARED RAYS-CURING PUTTY COMPOSITION

BACKGROUND OF THE INVENTION (1) Field of the Invention

The present invention relates to a putty composition which is capable of being quickly cured by near infrared rays.

(2) Description of the Background Art

A repair coating on an automobile body, etc. in the art usually consists of the following successive steps of ① a step of stripping an original finished film in a damaged area, ② a step of thick applying a body filler to the damaged area by use of a spatula or the like so that the body filler may not hang over an original finished film in an area other than the damaged area, followed by drying and abrading a body filler-applied surface, ③ a step of applying thereonto a resin putty so that the resin putty may hang over an original finished film around the damaged area by use of a spatula or the like, followed by drying and abrading a resin putty-applied surface, ④ a step of coating thereonto a primer surfacer, ⑤ a step of coating a topcoating, and so forth. Particularly, the steps from the putty application step ② to the primer surfacer coating step ④ require much labor and spend about half of the time required for the repair coating, because respective coated surfaces formed in respective coating steps are all abraded from the standpoint of obtaining satisfactory finish properties.

The body filler and the resin putty used in the above putty-application are a cold-curing composition containing an unsaturated polyester resin or the like as a major component and an organic peroxide as a curing agent, and have a very short pot life, because improvements in quick-drying properties for the purpose of shortening a working time have been followed after so far, resulting in that a great deal of skill was required for carrying out a quick putty-application within a period of time required depending on the damaged extents and areas of an automobile different from each other. On the other hand, for example, Japanese Patent Application Laid-Open No. 117588/79 discloses, as a putty, an ultraviolet light-curing composition containing a polymerizable unsaturated group-containing compound and a photosensitizer. The above composition has no limitation to the pot life, but raises such problems that since in the case where the putty is thick applied in the ultraviolet light curing, the ultraviolet light does not permeate through the interior of the putty, but only the surface of the applied putty is cured, a light transmitting filler is used as a filler to improve light transmission properties, resulting in that a pigment, which is widely used in the putty and has a high hiding power, can not be used, and in that harmful gases such as ozone gas and the like generate from a lamp used in the ultraviolet light irradiation.

Japanese Patent Application Laid-Open No. 192459/94 proposes a near infrared rays-curing foaming resin composition as a means of obtaining a thick cured product by light irradiation. The use of the above composition makes it possible to obtain a thick cured product without producing a problem of generating a harmful gas, but the above composition is such that the use of foams such as a hollow filler and the like results expansion of a volume of the cured product, resulting in that abrasion of the applied putty is indispensable and in that the abrasion causes to form holes due to foams and to show very poor finish properties.

SUMMARY OF THE INVENTION

It is an object of the present invention to provide a near infrared rays-curing putty composition, which is capable of obtaining a thick cured product in a short curing time without generating harmful gases as in the ultraviolet light curing, which is of one-pack type and is a resource-saving composition capable of making a solvent-free composition and reducing an environmental pollution, which is capable of greatly simplifying repair coating steps.

That is, the present invention provides a near infrared rays-curing putty composition containing (A) a polymerizable unsaturated group-containing resin, (B) a polymerizable unsaturated compound and (C) a near infrared rays polymerization initiator, said near infrared rays polymerization initiator (C) being a near infrared rays-absorbing cationic dye.

DETAILED DESCRIPTION OF THE INVENTION

The polymerizable unsaturated group-containing resin (A) is a resin having at least one ethylenically unsaturated group in one melecule, and may include, for example, ones prepared by introducing (meth)acrylate group, allyl group or the like into a resin such as polyester resin, acrylic resin, vinyl resin, polybutadiene resin, alkyd resin, epoxy resin, urethane resin and the like. These may be used alone or in combination. The above resin (A) may be prepared by known methods of introducing a polymerizable unsaturated group, for example, a method of reacting carboxyl group-containing acrylic resin or polyester resin with glycidyl (meth) acrylate, a method of reacting a hydroxyl group-containing vinyl resin or polyester resin with maleic anhydride, itaconic anhydride or the like, a method of reacting an isocyanate group-containing urethane resin with 2-hydroxyethyl (meth)acrylate or the like, a method of reacting a reaction product between 2-hydroxyethyl (meth) acrylate or the like and a diisocyanate compound with a hydroxyl group-containing resin, and the like. Of these, the resin (A) may preferably include an unsaturated polyester resin having a number average molecular weight of 500 to 10,000 from the standpoints of workability and the like. The polybasic acid used for the preparation of the unsaturated polyester resin may include, for example, saturated polybasic acids such as phthalic anhydride, phthalic acid, isophthalic acid, terephthalic acid, tetrahydrophthalic anhydride, hexahydrophthalic anhydride, adipic acid, chlorendic acid and the like; unsaturated polybasic acids such as maleic anhydride, itaconic acid, and the like. Examples of the polyhydric alcohol may include ethylene glycol, propylene glycol, neopentyl glycol, trimethylolpropane, pentaerythritol, hydrated bisphenol A, ethylene oxide or propylene oxide derivative of bisphenol A, and the like. Further, the unsaturated polyester resin preferably has allyl group from the standpoints of curing properties and workability.

Introduction of the allyl group may be carried out by using glycerin allyl ether, trimethylolpropane allyl ether and the like as an alcohol component to be introduced into a polyester main chain, or by reacting polyhydric alcohol and allylglycidyl ether with the polybasic acid to be introduced into the polyester main chain.

The resin (A) may also include an unsaturated epoxy resin having a number average molecular weight of 300 to 10,000. Specific example thereof may include a resin prepared by addition of an unsaturated acid such as (meth) acrylic acid and the like to an epoxy resin such as bisphenol A-diglycidyl ether type epoxy resin, dimer acid-diglycidyl ether type epoxy resin, glycidyl ester type epoxy resin, alicyclic type epoxy resin and the like, and the like.

The resin (A) may also include unsaturated acrylic resin having a number average molecular wight of 2,000 to 50,000. Specific examples thereof may include a resin which is prepared by addition of glycidyl (meth)acrylate, allylglycidyl ether or the like to a carboxyl group-containing acrylic resin prepared by copolymerizing an ethylenically unsaturated acid such as (meth)acrylic acid or the like as an essential component with at least one monomer selected from the group consisting of (meth) acrylates such as methyl (meth)acrylate and butyl (meth) acrylate, styrene, (meth) acrylonitrile and the like; a resin which is prepared by addition of a reaction product between 2-hydroxyethyl (meth)acrylate, (meth)allylalcohol or the like and a diisocyanate compound to a hydroxyl group-containing acrylic resin prepared by copolymerizing a hydroxyl group-containing monomer as an essential component with the above monomer; and the like.

The polymerizable unsaturated compound (B) used in the present invention may include ethylenically unsaturated group-containing monomers or oligomers, for example, (meth)acrylates of monohydric or polyhydric alcohol such as ethyl (meth)acrylate, butyl (meth)acrylate, 2-ethylhexyl (meth)acrylate, isobornyl (meth)acrylate, norbornyl (meth) acrylate, adamantyl (meth)acrylate, hydroxyethyl (meth) acrylate, trimethylolpropane tri(meth)acrylate, tetramethylolmethane tetra(meth)acrylate, dipentaerythritol (meth) acrylate, tricyclodecanedimethanol di(meth)acrylate, 2,2-bis (4-(3-methacryloxy-2-hydroxypropoxy) -phenyl)propane, di(methacryloxyethyl)trimethylhexamethylene-diurethane, 2,2-bis(4-methacryloxy-polyethoxyphenyl)propane and the like; ethylene glycol dimalate, propylene glycol diitaconate and the like; 4-(meth)acryloyloxyl group-containing aromatic polycarboxylic acid and acid anhydride thereof such as 4-(meth)acryloyloxymethoxycarbonyl phthalic acid, 4-(meth)acryloyloxyethoxy-carbonyl phthalic acid and the like; aromatic vinyl compounds such as styrene, α-methylstyrene, chlorostyrene, vinyltoluene, t-butylstyrene, divinylbenzene and the like; diallyl phthalate, diallyl isophthalate; epoxy acrylate, polyester acrylate, polydimethylsilicone di(meth)acrylate, urethane oligomer, and the like. These may be used alone or in combination.

A weight ratio of the above resin (A) and the compound (B) may arbitrarily be determined depending on properties thereof as well as kinds and amounts of fillers etc. to be used, but desirably is in the range of 90/10 to 10/90, preferably 80/20 to 20/80.

In the present invention, the resin (A) may optionally contain a reactive functional group in addition to the polymerizable unsaturated group. In this case, a polymerizable unsaturated compound containing another reactive functional group capable of reacting with the reactive functional group in the resin (A) may be used as the compound (B), a compound (D) containing another reactive functional group capable of reacting with the reactive functional group in the resin (A) may further be added, and so forth. Combinations of reactive functional groups may be selected without limitation from known combinations in the art. Examples of the combination may include ones between hydroxyl group and isocyanate group, epoxy group and amino group, epoxy group and carboxyl group, and the like. Either one of reactive functional groups in the above combinations may be contained in the resin (A). Specifically, for example, in the case where the resin (A) contains epoxy group, the compound (B) may be an adduct between glycidyl (meth) acrylate and polyamine and the like, or the compound (D) may be a polyamine compound and the like. On the other hand, for example, in the case where the resin (A) contains hydroxyl group, the compound (B) may be an adduct between 2-hydroxyethyl (meth)acrylate and a polyisocyanate compound, and the like, or the compound (D) may be a polyisocyanate compound and the like. An amount of the compound (D) may suitably be in the range of 30% by weight or less based on a total amount of the resin solid content.

A heat-curing component consisting of a functional group-containing resin such as an acrylic polyol and a crosslinking agent such as a polyisocyanate compound may be added to the resin (A) and the compound (B) in an amount in the range of 30% by weight or less based on the resin solid content.

In the case where the compound (B) and the compound (D) are used, or the heat curing component is used, two-pack type is desirably used.

The near infrared rays polymerization initiator (C) used in the present invention is a near infrared rays-absorbing cationic dye. The near infrared rays-absorbing cationic dye may preferably include a near infrared rays-absorbing cationic dye, which is excited by a light energy at a wave length in the region of 650 to 1500 nm, which is disclosed in Japanese Patent Application Laid-Open No. 111402/91, EP Publication No. 438123, etc., and which, if needed, may desirably be used in combination with a boron based sensitizer.

Examples of the near infrared rays-absorbing cationic dye particularly useful in the present invention are shown in the following Tables 1 to 8.

TABLE 1

| Dye No. | Structure | R | Ar | λ max (TMPT) |
|---------|-----------|---|----|--------------|
| 1 | 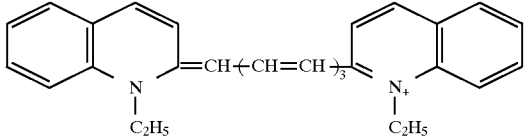 Ph₃⁻.n-C₄H₉ | | | 820 nm |

TABLE 1-continued
| Dye No. | Structure | R | Ar | λ max (TMPT) |
|---|---|---|---|---|
| 2 | 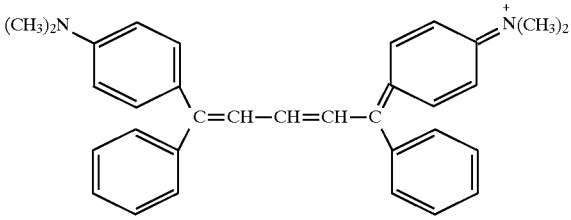 Ph₃B⁻·n-C₄H₉ | | | 830 nm |
| 3-A | 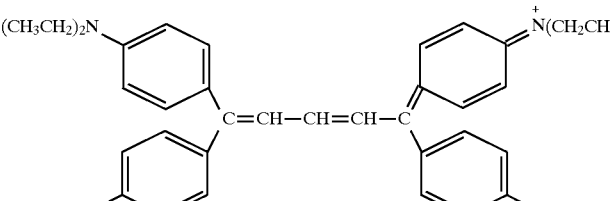 Ar₃B⁻·R | n-butyl | phenyl | 822 nm |
| 3-B | | n-hexyl | anisyl | 822 nm |
| 3-C | | n-octyl | phenyl | 822 nm |
TABLE 2
| Dye No. | Structure | R | Ar | λ max (TMPT) |
|---|---|---|---|---|
| 4 | 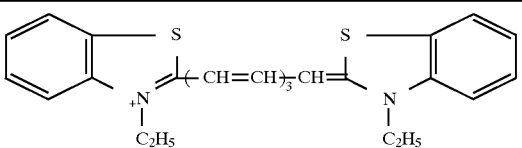 Ph₃B⁻·n-C₄H₉ | | | 768 nm |
| 5-A | 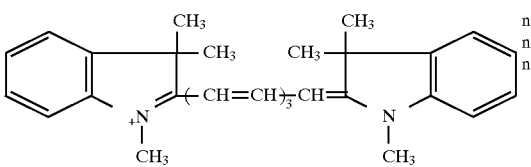 Ar₃B⁻·R | n-butyl | phenyl | 748 nm |
| 5-B | | n-hexyl | anisyl | 748 nm |
| 5-C | | n-octyl | phenyl | 748 nm |
TABLE 3
| Dye No. | Structure | R | Ar | λ max (TMPT) |
|---|---|---|---|---|
| 6-A | 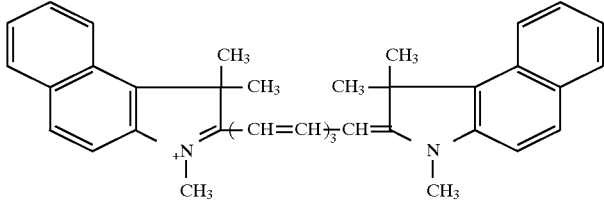 Ar₃B⁻·R | n-butyl | phenyl | 785 nm |
| 6-B | | n-hexyl | anisyl | 785 nm |
| 6-C | | n-octyl | phenyl | 785 nm |

TABLE 3-continued
| Dye No. | Structure | R | Ar | λ max (TMPT) |
|---|---|---|---|---|
| 7-A | 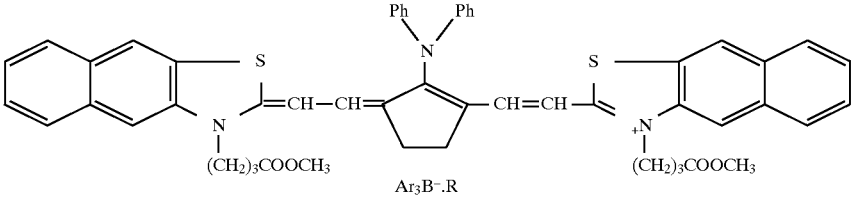 Ar₃B⁻.R | n-butyl | phenyl | 828 nm |
| 7-B | | n-hexyl | anisyl | 828 nm |
| 7-C | | n-octyl | phenyl | 828 nm |
| 8 | 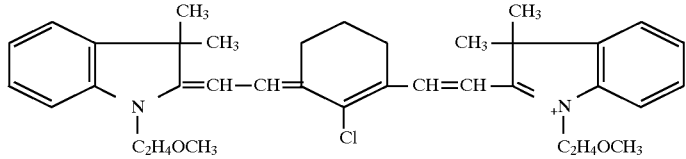 Ph₃B⁻.n-C₄H₉ | | | 787 nm |
TABLE 4
| Dye No. | Structure | R | Ar | λ max (TMPT) |
|---|---|---|---|---|
| 9 | 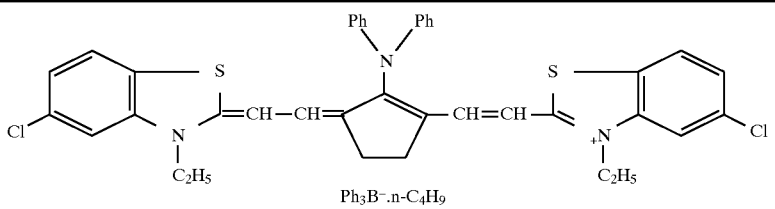 Ph₃B⁻.n-C₄H₉ | | | 819 nm |
| 10 | 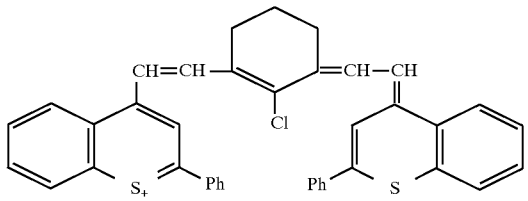 Ph₃B⁻.n-C₄H₉ | | | 1080 nm |
TABLE 5
| Dye No. | Structure | λ max (TMPT) |
|---|---|---|
| 11 | 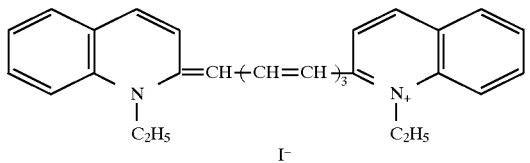 | 820 nm |

TABLE 5-continued
| Dye No. | Structure | λ max (TMPT) |
|---|---|---|
| 12 | 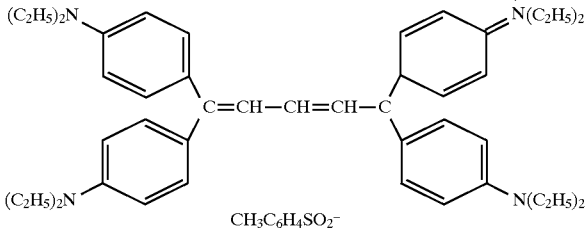 CH₃C₆H₄SO₂⁻ | 822 nm |
| 13 | 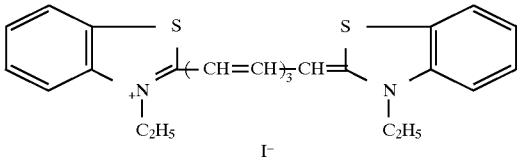 I⁻ | 768 nm |
TABLE 6
| Dye No. | Structure | λ max (TMPT) |
|---|---|---|
| 14 | 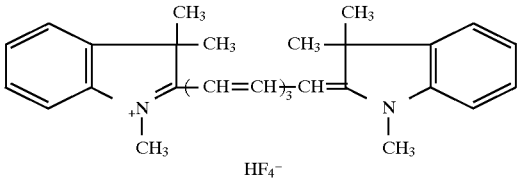 HF₄⁻ | 748 nm |
| 15 | 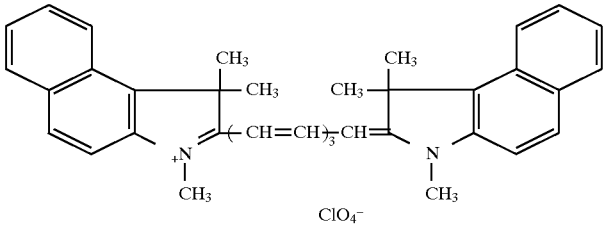 ClO₄⁻ | 785 nm |
| 16 | 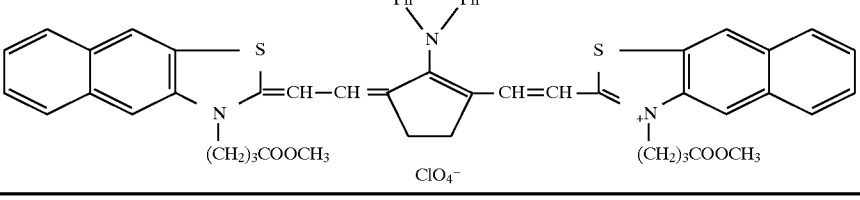 ClO₄⁻ | 828 nm |

TABLE 7

| Dye No. | Structure | λ max (TMPT) |
|---|---|---|
| 17 | (indoline dye with CH₃, C₂H₄OCH₃ substituents, cyclohexene-Cl bridge, CH=CH linkages) BF₄⁻ | 787 nm |
| 18 | (benzothiazoline dye with Cl, C₂H₅ substituents, cyclopentene-NPh₂ bridge, CH=CH linkages) ClO₄⁻ | 819 nm |
| 19 | (benzothiopyran dye with Ph substituents, cyclohexene-Cl bridge, CH=CH linkages) ClO₄⁻ | 1080 nm |

TABLE 8

| Dye No. | Structure | λ max (TMPT) |
|---|---|---|
| 20 | $(CH_3)_2N$—C₆H₄—CH=CH—C(=CH—CH=C₆H₄=N⁺(CH₃)₂)—C₆H₄—N(CH₃)₂  ClO₄⁻ | 770 nm |

In Tables 1–8, λ represents an absorption wave length, Ph represents phenyl group, and TMPT represents trimethylolpropane trimethacrylate.

The boron based sensitizer optionally used in the present invention is a quaternary ammonium boron complex disclosed in the above EP Publication No. 438123, and may preferably include, for example, tetramethylammonium n-butyltriphenyl borate, tetramethyl-ammonium n-butyltrianisyl borate, tetramethylammonium n-octyltriphenyl borate, tetramethylammonium n-octyltrianisyl borate, tetraethylammonium n-butyltriphenyl borate, tetraethylammonium n-butyltrianisyl borate, trimethylhydrogenammonium n-butyltriphenyl borate, triethylhydrogenammonium n-butyltriphenyl borate, tetrahydrogenammonium n-butyltriphenyl borate, tetramethylammonium tetrabutyl borate, tetraethylammonium tetrabutyl borate and the like.

The near infrared rays polymerization initiator (C) is used in an amount of 0.01 to 10% by weight based on a total amount of the resin (A) and the compound (B).

The initiator (C) may preferably be used in combination with an oxygen scavenger capable of absorbing oxygen during a free radical chain reaction and a chain transfer agent as an activated hydrogen doner. Examples of the oxygen scavenger may include phosphine, phosphite, phosphonate, stannous compounds, and other compounds easily oxidized by oxygen. Examples of the chain transfer agent may include N-phenylglycine, 2-mercaptobenzoxazole, 2-mercaptobenzothiazole; N,N-dialkylaniline such as 2,6-diisopropyl-N,N-dialkylaniline, N,N,2,4,6-pentamethylaniline and the like, and the like.

The initiator (C) may also be used in combination with an organic peroxide. Examples of the organic peroxide may include benzoyl peroxide, methyl ethyl ketone peroxide, cyclohexanone peroxide and the like.

The composition of the present invention, if needed, may further contain cellulose derivatives, non-reactive diluents, thermoplastic resins and the like from the standpoints of improvements in adhesion properties to a substrate or a topcoating layer and in workability. The cellulose derivative may include cellulose acetate butyrate (CAB), nitrocellulose and the like, and further may include a graft copolymer of cellulose derivatives such as CAB with a monomer mixture of hydroxyl group-containing unsaturated monomer, other ethylenically unsaturated monomer and the like. The non-reactive diluent may include an organic solvent and the like. Examples of the thermoplastic resin may include polyethylene, polystyrene, polymethylmethacrylate, polyvinyl acetate, polyvinyl chloride, polycaprolactone and the like. Of these, particularly use of the cellulose derivative such as the CAB graft copolymer preferably results in an orientation of hydroxyl group on the putty-applied surface and in improvements in adhesion properties in the case where the topcoating is an urethane-curing one.

The above optional components may desirably be used in an amount of 0 to 40% by weight, preferably 0 to 20% by weight or so based on a total amount of the resin (A) and the compound (B) within a range of a good compatibility with the resin (A) and the compound (B).

The composition of the present invention may also contain a phosphate group-containing compound from the standpoint of improving adhesion properties to the substrate. Examples of the phosphate group-containing compound may include acid phosphates such as dibutyl phosphate; 2-ethylhexyl phosphate and the like, acid phosphite, polyphosphoric acid compounds thereof, phosphoric acid copolymerized resin and the like.

The composition of the present invention, if needed, may also contain fillers. The filler may include pigments and resin powder. Examples of the pigments may include extender pigments such as talc, mica, barium sulfate, Kaolin, calcium carbonate, clay, silica, quartz, glass and the like, and color pigments such as titanium white, red oxide, carbon black, iron black and the like.

The resin powder may include resin particles such as known polymer beads, ones prepared by finely grinding a polymer of the above monomers, gelation polymer fine particles (see U.S. Pat. Nos. 4,147,688, 4,180,489, 4,220,679, 4,290,932, 4,461,870, etc.), and the like. Particularly, a gelation polymer fine particle obtained by emulsion polymerization of a monomer mixture containing a divinyl monomer in the presence of an allyl group-containing reactive emulsifier (see U.S. Pat. No. 5,348,998) is preferred from the standpoint of showing good dispersion properties to the resin (A) and the compound (B).

A particle size of the resin powder may arbitrarily be selected without particular limitation, but usually in the range of 30 $\mu$m or less, preferably 0.05 to 10 $\mu$m. When the particle size is more than 30 $\mu$m, particularly in the case where the putty is thin applied, the putty-applied surface undesirably shows poor smoothness. Control of the particle size may be carried out by a method known in the art, for example, in the case of the above gelation polymer fine particle, by controlling the kind and amount of the reactive emulsifier.

A mixing amount of the above filler is in the range of 0 to 80% by weight based on a solid content in the coating composition. Of these, the resin powder is used in an amount of 1 to 100 parts by weight, preferably 5 to 50 parts by weight per 100 parts by weight of a total solid content in the resin (A) and compound (B). Use of an amount more than 100 parts by weight causes to increase viscosity of the putty, resulting in reducing workability. On the other hand, use of an amount less than one part by weight results in making it impossible to obtain an effect as a stress relaxation agent and to expect improved adhesion properties.

The putty composition obtained as above is such that only one coating makes it possible to form a film having a film thickness of several mm or more, and to repair damaged areas without sagging, and is coated onto a surface of a substrate, followed by irradiating near infrared rays to be cured. Coating of the above putty coating composition may be carried out by a method known in the art, for example, by a spatula-application method, or a method of controlling a coating viscosity for a spray coating.

Next, the putty composition is subjected to the infrared rays irradiation to be cured. A light source to be used may include ones having a wave length in the range of 600 to 1500 nm without particular limitations, for example, halogen lamp, semiconductor laser, light-emitting diode or the like. Irradiation conditions may arbitrarily be selected depending on thickness and compositions of the putty-applied layer.

Curing of the near infrared rays-curing putty-applied layer may be followed, if needed, by abrading the putty-applied surface, and coating a topcoating thereonto. If needed, prior to coating the topcoating, a primer surfacer coating may be carried out. Any primer surfacer, which has usually been used for repair coating, for example, lacquer series, urethane series, alkyd series, epoxy series and the like, may be used in the primer surfacer coating without particular limitations.

On coating the above topcoating, any topcoating compositions including an organic solvent type, an aqueous type and the like as usually used in the repair coating, for example, acrylic lacquer, urethane-curing coating composition, fluorocarbon resin based coating composition and the like, may be used without particular limitations, the urethane-curing coating composition being particularly preferred.

The putty composition of the present invention is useful for repair of the automobile, and may also be usable for repairing crazes of architectures and fittings, and for filling up.

The putty composition of the present invention is of a near infrared rays-curing type, is capable of obtaining a thick cured product without generating harmful gases as in the ultraviolet light-curing type and is a resource-saving composition capable of making a solvent-free one-pack type in a short curing time, resulting in making it possible to reduce environmental pollution and to provide a repair coating greatly simplified in coating steps.

The present invention will be explained more in detail by the following Examples, in which "part" and "%" represent "part by weight" and "% by weight" respectively.

PREPARATION EXAMPLE 1

(Preparation of Resin Powder)

One liter-flask equipped with a stirrer, thermometer, condenser and heating mantle was charged with 3547.5 parts of deionized water, and 40 parts of Latemul S-120 A (trade name, marketed by Kao Co., Ltd., sulfosuccinic acid based allyl group-containing anionic reactive emulsifier, 50% aqueous solution), followed by heating up to 90° C. with agitation, adding 20% of an aqueous solution prepared by dissolving 12.5 parts of VA-086 (trade name, marketed by Wako Pure Chemical Industries Ltd., water-soluble azoamide polymerization initiator) into 500 parts of deionized water. Fifteen minutes thereafter, 5% of a monomer mixture of 300 parts of styrene, 400 parts of methyl methacrylate, 200 parts of n-butyl acrylate and 100 parts of 1,6-hexanediol diacrylate was added, followed by stirring for 30 minutes. Thereafter, dropping of the remaining monomer mixture and aqueous polymerization initiator solution was started, and dropping of the monomer mixture was carried out over 3 hours, while dropping of the aqueous polymerization initiator solution was carried out over 3.5 hours keeping at 90° C. The completion of the dropping of the aqueous polymerization initiator was followed by keeping at 90° C. for 30 minutes, cooling down to room temperature, removing by use of a filter cloth to obtain an aqueous gelation fine particle polymer water dispersion having a solid content of 20% and a particle size of 72 nm. The water dispersion was dried on a pallet to obtain a resin powder G.

EXAMPLE 1
(Preparation of Putty Composition)

A mixture of 100 parts of an unsaturated group-containing epoxy resin SP-1507 (trade name, marketed by Syowa Highpolymer Co., Ltd., epoxy-acrylate resin, number average molecular weight: 480), 15 parts of styrene, 5 parts of cellulose acetate butyrate, 10 parts of titanium white and 100 parts of talc was stirred and dispersed for 20 minutes by use of a high-speed dissolver, followed by adding 2 parts of a near infared rays-absorbing cationic dye ① (Note 1), 5 parts of tetramethylammonium n-butyltriphenyl borate and one part of N,N,2,4,6-pentamethyl aniline, and mixing to obtain a putty composition.

EXAMPLES 2–13 and COMPARATIVE EXAMPLES 1–2

Experiments were carried out in the same manner as in Example 1 except that formulations of components such as the resin, monomer, initiator and the like were as shown in Table 9 respectively to obtain putty compositions respectively. In Comparative Example 1, just prior to coating, methyl ethyl ketone peroxide was added.

Respective putty compositions obtained as above were coated onto the following test panels to be a thickness of 5 mm by use of a spatula, followed by carrying out irradiation by use of a 1500 W output halogen lamp at an irradiation distance of 15 cm for 10 minutes. In Comparative Example 2, irradiation was carried out by use of a 100 W output high pressure mercury lamp at an irradiation distance of 10 cm for 30 seconds.

Performance test results of respective coated test panels obtained as above are shown in Table 9.

Preparation of Test Panels:

A mild steel sheet (90×150×0.8 mm), a galvanized iron sheet (90×150×0.8 mm), an aluminum sheet (90×150×0.8 mm) and a coated galvanized iron sheet prepared by coating Amilac White (Trade name, aminoalkyd resin based coating composition, marketed by Kansai Paint Co., Ltd.) onto the galvanized iron sheet to be a dry film thickness of 40 μm, followed by heat curing at 140° C. for 20 minutes, and by slightly abrading by use of a #400 water resistant abrasive paper, were used as test panels respectively.

In Table 9, "(Note)" and test methods are as follows.
(Note 1) Infrared rays-absorbing cationic dyes.

①: (Absorption wave length: 822 nm)

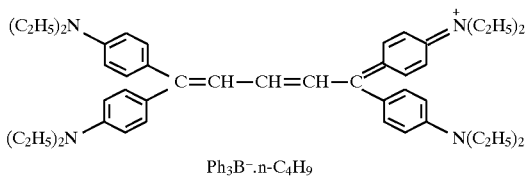

Ph$_3$B$^-$.n-C$_4$H$_9$

②: (Absorption wave length: 787 nm)

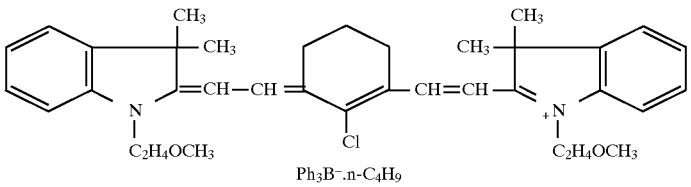

Ph$_3$B$^-$.n-C$_4$H$_9$

③: (Absorption wave length: 874 nm)

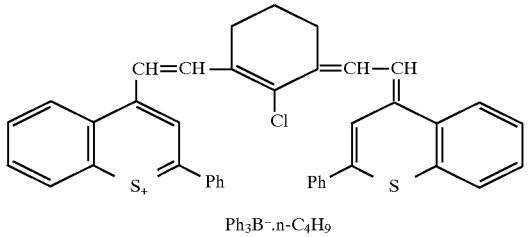

Ph$_3$B$^-$.n-C$_4$H$_9$ (Note 2) Unsaturated group-containing epoxy resin "SP-5003": Trade name, marketed by Showa Highpolymer Co., Ltd., epoxy-acrylate resin.

(Note 3) Unsaturated group-containing polyester resin "POLYSET 1127, 1721": Trade names, marketed by Hitachi Chemical Co., Ltd., allyl group-containing polyester resin.

(Note 4) ACRYDIC A-801P: trade name, marketed by Dainippon Ink & Chemicals Inc., acrylic polyol resin, solid content 50%.

(Note 5) DURANATE TPA-90E: trade name, Asahi Chemical Industry Co., Ltd., hexamethylene diisocyanate.

(Note 6) DP-4: trade name, marketed by Daihachi Chemical Industry Co., Ltd., dibutyl phosphate.

Test Methods:

(*1) Drying Properties: Tack on the surface of the coated mild steel sheet test panel and cure of the inner part thereof were examined by touching. (3: good, 2: the surface shows some tack, but the inner part is well cured, 1: the surface shows no tack, but the inner part is not well cured.

(*2) Adhesion Properties: Respective coated test panels were bent in a central part at a bent angle of 90° to examine the conditions of the putty in the bent part (2: good, 1: peeling of the putty is developed.).

(*3) Abrasion Properties: The surface of the coated mild steel sheet test panel was abraded by a #400 water resistant abrasive paper to observe abraded conditions (3: good, 2: cheese grating is observed to some extent, 1: cheese grating is observed to a considerable extent.).

TABLE 9

|  | Examples | | | | | | | |
| --- | --- | --- | --- | --- | --- | --- | --- | --- |
|  | 1 | 2 | 3 | 4 | 5 | 6 | 7 | 8 |
| Unsaturated group-containing resin SP21507 | 100 |  |  |  | 100 |  |  | 100 |
| Unsaturated group-containing resin SP-5003 (Note 2) | 100 |  |  |  | 100 | 100 |  |  |
| Unsaturated group-containing resin Polyset 1127 (Note 3) |  |  | 100 |  |  |  |  |  |
| Unsaturated group-containing resin Polyset 1721 |  |  |  | 100 |  |  |  |  |
| Styrene | 15 | 20 |  |  | 15 | 15 |  |  |
| Isobornyl acrylate |  | 20 |  |  |  | 10 | 10 | 10 |
| 2-hydroxyethyl acrylate |  |  | 10 |  |  |  |  | 10 |
| Acrydic A-801P (Note 4) |  |  |  |  |  |  |  |  |
| Duranate TPA-90E (Note 5) |  |  |  |  |  |  |  |  |
| Cellulose acetate butyrate | 5 | 5 | 5 | 5 |  | 5 |  | 5 |
| DP-4 (Note 6) |  | 1 |  | 1 |  |  |  |  |
| Titanium white | 10 | 10 | 10 | 10 | 10 |  |  | 10 |
| Talc | 100 | 100 | 100 | 100 | 100 |  |  | 100 |
| Resin powder (G) |  |  |  |  |  |  |  |  |
| Near infrared rays-absorbing cationic dye (Note 1) |  |  |  |  |  |  |  |  |
| 1 | 2 |  | 2 |  | 2 | 1 | 1 | 5 |
| 2 |  | 2 |  |  |  |  |  |  |
| 3 |  |  |  | 2 |  |  |  |  |
| Tetra-n-butylammonium n-butyltriphenyl borate | 5 | 5 | 5 | 5 |  |  |  |  |
| Tetramethylammonium n-butyltriphenyl borate |  |  |  |  | 5 |  |  | 5 |
| N, N, 2, 4, 6-pentamethylaniline | 1 | 1 | 1 | 1 | 1 |  |  | 1 |
| Benzoyl ethyl ether |  |  |  |  |  |  |  |  |
| Methyl ethyl ketone peroxide |  |  |  |  |  |  |  |  |
| Performance test |  |  |  |  |  |  |  |  |
| Drying properties (*1) | 3 | 3 | 2 | 2 |  |  |  |  |
| Adhision properties (*2) |  |  |  |  |  |  |  |  |
| Mild steel sheet | 2 | 2 | 2 | 2 | 2 | 2 | 2 | 2 |
| Galvanized sheet | 1 | 2 | 1 | 2 | 1 | 1 | 1 | 1 |
| Aluminum sheet | 2 | 2 | 2 | 2 | 2 | 2 | 2 | 2 |
| Coated Galvanized sheet | 2 | 2 | 2 | 2 | 2 | 2 | 2 | 2 |
| Abrasion properties (*3) | 3 | 3 | 3 | 3 | 2 | 3 | 2 | 3 |

|  | Examples | | | | | Comparative Examples | |
| --- | --- | --- | --- | --- | --- | --- | --- |
|  | 9 | 10 | 11 | 12 | 13 | 1 | 2 |
| Unsaturated group-containing resin SP21507 | 100 | 100 |  |  |  | 100 | 100 |
| Unsaturated group-containing resin SP-5003 (Note 2) |  |  | 100 |  |  |  |  |
| Unsaturated group-containing resin Polyset 1127 (Note 3) |  |  |  | 100 |  |  |  |
| Unsaturated group-containing resin Polyset 1721 |  |  |  |  | 100 |  |  |
| Styrene | 15 | 15 |  |  | 15 | 15 | 15 |
| Isobornyl acrylate |  |  | 20 |  |  |  |  |
| 2-hydroxyethyl acrylate |  |  |  | 10 |  |  |  |
| Acrydic A-801P (Note 4) | 10 |  |  |  |  |  |  |
| Duranate TPA-90E (Note 5) | 1.9 |  |  |  |  |  |  |
| Cellulose acetate butyrate | 5 |  |  |  |  | 5 |  |
| DP-4 (Note 6) |  |  | 1 |  | 1 |  |  |
| Titanium white | 10 |  |  |  |  | 10 | 10 |
| Talc | 100 |  |  |  | 50 | 100 | 100 |
| Resin powder (G) |  | 10 | 20 | 10 | 15 |  |  |
| Near infrared rays-absorbing. cationic dye (Note 1) |  |  |  |  |  |  |  |
| 1 | 2 | 2 |  |  | 2 |  |  |
| 2 |  |  |  |  | 2 |  |  |
| 3 |  |  |  |  | 2 |  |  |
| Tetra-n-butylammonium n-butyltriphenyl borate | 5 | 5 | 5 | 5 | 5 |  |  |
| Tetramethylammonium n-butyltriphenyl borate |  |  |  |  |  |  |  |
| N, N, 2, 4, 6-pentamethylaniline | 1 | 1 | 1 | 1 | 1 |  |  |
| Benzoyl ethyl ether |  |  |  |  |  |  | 2 |
| Methyl ethyl ketone peroxide |  |  |  |  |  | 2 |  |
| Performance test |  |  |  |  |  |  |  |
| Drying properties (*1) | 3 | 3 | 3 | 3 | 3 | 2 | 1 |
| Adhision properties (*2) |  |  |  |  |  |  |  |
| Mild steel sheet | 2 | 2 | 2 | 2 | 2 | 2 | 1 |
| Galvanized sheet | 1 | 1 | 2 | 1 | 2 | 1 |  |
| Aluminum sheet | 2 | 2 | 2 | 2 | 2 | 1 | 1 |
| Coated Galvanized sheet | 2 | 2 | 2 | 2 | 2 | 1 | 1 |
| Abrasion properties (*3) | 3 | 3 | 3 | 3 | 3 | 2 | 1 |

TABLE 10

| | Examples | | | | | | | | | | | | | Comparative Examples | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 |
| Finish properties (*4) Water Resistance (*5) | 3 | 3 | 3 | 3 | 2 | 3 | 2 | 3 | 3 | 3 | 3 | 3 | 3 | 2 | 1 |
| Coated surface conditions | 3 | 3 | 3 | 3 | 2 | 3 | 3 | 3 | 3 | 3 | 3 | 3 | 3 | 2 | 1 |
| Bending adhesion properties test | 2 | 2 | 2 | 2 | 2 | 2 | 2 | 2 | 2 | 2 | 2 | 2 | 2 | 1 | 1 |
| Cut squares-adhesive cellophane tape adhesion test | 3 | 3 | 3 | 3 | 2 | 3 | 3 | 3 | 3 | 3 | 3 | 3 | 3 | 2 | |
| Spatula Coating Workability (*6) | 2 | 2 | 2 | 2 | 2 | 1 | 1 | 2 | 2 | 3 | 3 | 3 | 3 | 2 | 2 |

Coating Test:

The putty compositions obtained in Examples and Comparative Examples were coated and smoothed by use of a spatula onto a mild steel sheet (90×150×0.8 mm) to be 5 mm in thickness, followed by covering with a transparent PET film, irradiating by use of a 1500 W output halogen lamp at an irradiation distance of 15 cm for 10 minutes for curing. The putty-applied surface was abraded by a #400 water resistant abrasive paper, followed by spray coating "RETAN PG-80 White", (trade name, acrylic-urethane resin based topcoating composition, marketed by Kansai Paint Co., Ltd.) to be a dry film thickness of 50 $\mu$m, and drying at 60° C. for 30 minutes to obtain topcoated test panels.

The putty composition of Comparative Example 2 was subjected to a coating test in the same manner as in the above Examples except that the irradiation was carried out by use of a 100 W output high pressure mercury lamp in place of the halogen lamp at an irradiation distance of 10 cm for 30 seconds.

Performance test results of the above topcoated test panels are shown in Table 10. Test methods in Table 10 are as follows.

(*4) Finish Properties: Finish properties of the topcoated test panels are evaluated by the naked eyes (3: good, 2: The coated surface shows some distortion, 1: The coated surface shows considerable distortion and putty marks.).

(*5) Water Resistance: The above topcoated test panels were dipped into a tap water for 7 days, followed by examining conditions (development of blister) of the coated surface, and being subjected to the bending adhesion properties test (*2) and a cut squares-adhesive cellophone tape adhesion test. Conditions of the coated surface were evaluated as follows. 3: good, 2: Blister partly develops, 1: Blister develops all over the surface. The cut-squares-adhesive cellophane tape adhesion test results were evaluated as follows. 3: No peeling developed, 2: Peeling partly developed, 1: Peeling developed all over the surface.

(*6) Spatula Coating Workability: On coating a putty composition by use of a spatula, easiness of smoothing the putty and conditions of the putty-applied surface just after coating were examined by the naked eye to evaluate as follows. 3: The putty is easily smoothed and a smooth coated surface is obtained without holes, 2: The putty is rather difficult to be smoothed and a smooth coated surface is not obtained, 1: The putty is difficult to be smoothed with many holes and a smooth coated surface is not obtained.

What is claimed is:

1. A near infrared rays-curing putty composition comprising:

(A) a resin containing at least one polymerizable ethylenically unsaturated group, (B) a polymerizable unsaturated compound comprising monomers or oligomers containing at least one ethylenically unsaturated group, (C) a near infrared rays polymerization initiator, said near infrared rays polymerization initiator (C) being a near infrared rays-absorbing cationic dye, and (D) a resin powder consisting of gelation polymer fine particles obtained by emulsion polymerization, said gelation polymer fine particles being contained in an amount of 1 to 100 parts by weight per 100 parts by weight of a total solid content in the resin (A) and compound (B).

2. A composition as claimed in claim 1, wherein the polymerizable unsaturated group-containing resin (A) is selected from the group consisting of an unsaturated polyester resin having a number average molecular weight of 500 to 10,000, an unsaturated epoxy resin having a number average molecular weight of 300 to 10,000, and an unsaturated acrylic resin having a number average molecular weight of 2,000 to 50,000.

3. A composition as claimed in claim 2, wherein the unsaturated polyester resin has an allyl group.

4. A composition as claimed in claim 1, wherein a weight ratio of the resin (A) and the compound (B) is in the range of 90/10 to 10/90.

5. A composition as claimed in claim 1, wherein the initiator (C) is used in an amount of 0.01 to 10% by weight based on a total amount of the resin (A) and the compound (B).

6. A composition as claimed in claim 1, wherein said composition further contains a cellulose derivative.

7. A composition as claimed in claim 1, wherein said composition further contains an adhesion promoting phosphate group-containing compound.

* * * * *